(12) United States Patent
Mecklenburg

(10) Patent No.: US 10,320,276 B2
(45) Date of Patent: Jun. 11, 2019

(54) SCALABLE, HIGHLY DYNAMIC ELECTROMAGNETIC LINEAR DRIVE WITH LIMITED TRAVEL AND LOW TRANSVERSE FORCES

(71) Applicant: Rhefor GbR, Berlin (DE)

(72) Inventor: Arno Mecklenburg, Berlin (DE)

(73) Assignee: RHEFOR GBR, Berlin (DE)

( * ) Notice: Subject to any disclaimer, the term of this patent is extended or adjusted under 35 U.S.C. 154(b) by 999 days.

(21) Appl. No.: 14/435,382

(22) PCT Filed: Oct. 11, 2013

(86) PCT No.: PCT/DE2013/100352
§ 371 (c)(1),
(2) Date: Apr. 13, 2015

(87) PCT Pub. No.: WO2014/056487
PCT Pub. Date: Apr. 17, 2014

(65) Prior Publication Data
US 2015/0270766 A1    Sep. 24, 2015

(30) Foreign Application Priority Data

Oct. 12, 2012 (DE) .......................... 10 2012 020 041

(51) Int. Cl.
*H02K 41/00* (2006.01)
*H02K 41/02* (2006.01)
(Continued)

(52) U.S. Cl.
CPC ............. *H02K 41/02* (2013.01); *H01F 7/066* (2013.01); *H01F 7/121* (2013.01); *H01F 7/1615* (2013.01)

(58) Field of Classification Search
CPC .......... H02K 41/02; H02K 33/00; H01F 7/18; H01F 7/06; H01F 7/16
See application file for complete search history.

(56) References Cited

U.S. PATENT DOCUMENTS 4,604,599 A   8/1986   Koehler
4,644,311 A   2/1987   Guery et al.
(Continued)

FOREIGN PATENT DOCUMENTS

CN   1749622    3/2006
DE   3932274    4/1990
(Continued)

OTHER PUBLICATIONS

Patent Cooperation Treaty, "International Search Report" issued in International Application No. PCT/DE2013/100352, by European Searching Authority, document of 8 pages, dated May 2, 2014.
(Continued)

*Primary Examiner* — Thomas Truong
*Assistant Examiner* — Leda T Pham
(74) *Attorney, Agent, or Firm* — Akerman LLP; Peter A. Chiabotti

(57) ABSTRACT

A scalable, highly dynamic electromagnetic linear drive with limited travel. The linear actuator is distinguished by low transverse forces. The linear actuator comprises a stator comprising two soft-magnetic limbs; an armature made of soft-magnetic material which is flat at least in certain sections and which is arranged so as to be movable along an axis between the limbs of the stator; at least two flat coils with a soft-magnetic core and a large coil height, which coils are attached to the stator (stator coils), wherein the coil cores are part of the soft-magnetic limbs or are connected thereto in a magnetically conductive fashion; at least one flat coil (armature coil) with a soft-magnetic core and a large coil height which is attached to the armature, wherein the coil core can be part of the armature or can be formed therefrom, or the armature coil is located with its soft-magnetic core lying in a recess in the flat armature; a well-defined start and end position of the travel ("end positions"); at least one
(Continued)

switchable means which is designed to lock the armature in at least one end position counter to a restoring force, for example a self-locking magnet or a mechanical latch, a switchable power supply composed of an energy accumulator, for example a capacitor battery, and at least one switch.

20 Claims, 7 Drawing Sheets

(51) Int. Cl.
*H01F 7/121* (2006.01)
*H01F 7/16* (2006.01)
*H01F 7/06* (2006.01)

(56) References Cited

U.S. PATENT DOCUMENTS

| | | | |
|---|---|---|---|
| 4,940,958 | A | 7/1990 | Ootsuka |
| 6,476,702 | B1 | 11/2002 | Hartwig et al. |
| 6,611,413 | B2 * | 8/2003 | Takeuchi ............ H01H 33/285 361/139 |
| 2006/0027269 | A1 | 2/2006 | Neff et al. |
| 2007/0096855 | A1 | 5/2007 | Hirano |
| 2008/0272659 | A1 * | 11/2008 | Jeong ..................... H01H 33/38 310/28 |
| 2012/0161908 | A1 | 6/2012 | Naka et al. |
| 2013/0200966 | A1 * | 8/2013 | Michaelsen ............ H01F 7/066 335/261 |

FOREIGN PATENT DOCUMENTS

| | | |
|---|---|---|
| DE | 202011050847 | 11/2011 |
| DE | 102011080065 | 4/2012 |
| EP | 0174239 | 3/1986 |
| EP | 0258569 | 3/1988 |
| EP | 1624469 | 2/2006 |
| EP | 1655755 | 5/2006 |
| EP | 2388794 | 11/2011 |
| FR | 2554960 | 5/1985 |
| JP | S5671908 | 6/1981 |

OTHER PUBLICATIONS

State Intellectual Property Office of the P.R.C., "First Office Action Translation" dated Jul. 29, 2016 for Chinese Patent Application No. 201380059901.1, document of 6 pages.

* cited by examiner

SCALABLE, HIGHLY DYNAMIC ELECTROMAGNETIC LINEAR DRIVE WITH LIMITED TRAVEL AND LOW TRANSVERSE FORCES

CROSS REFERENCE TO RELATED APPLICATIONS

This application is a § 371 National Phase of PCT/DE2013/100352, filed Oct. 14, 2013, which claims priority to German Patent Application No. 10 2012 020 041.2, filed Oct. 12, 2012.

TECHNICAL FIELD

The application relates to the field of electromagnetic linear actuators, for example for compressing and holding springs in spring drive mechanisms.

BACKGROUND

In publication DE 10 2011 080 065 A1, an electromagnetic actuator is disclosed which is suitable for driving electrical switching mechanisms. Drives according to publication DE 10 2011 080 065 A1 consist of electromagnets having armatures which can also be driven electrodynamically, particularly close to the stroke initiation position—that is, with the working air gap wide open. This is achieved by means of at least one coil which is mechanically connected to the armature, and to which a force is applied by interaction of a magnetic excitation field with its current, wherein said force can be transmitted to the armature and thereby push the same in the direction of its stroke end position (closed working air gap).

The publication DE 10 2011 080 065 A1 discloses several embodiments, wherein those which have coils which are arranged coaxially (thin coils) in pairs on the frame and the armature are particularly suitable for driving electrical switching mechanisms. In the publication DE 10 2011 080 065 A1 these coils which are attached to the frame are termed "supporting coils", and the coils which additionally drive the armature and are functionally assigned to the supporting coils are termed "thrust coils" (in this case, thrust coils are typically wound [in] the circumferential grooves of the armature). Thrust coils and supporting coils are arranged coaxially, and the thrust coil partially plunges into the supporting coil when in the stroke initiation position. If at this point the thrust and supporting coils are fed current with opposing polarity, a repulsive interaction occurs between the same, additionally driving the armature.

It is characteristic for the arrangements described that under certain conditions, very large volume-specific forces can be developed, while the inductance (for example, given a series connection of both coils) can be very small compared to conventional electromagnets. With sufficient attenuation of the eddy currents in the frame and armature, it is then possible to achieve extraordinarily high rates of force increase.

The embodiments already known from the publication DE 10 2011 080 065 A1 have two disadvantages, however: poor scalability and high transverse forces on the armature. "Poor scalability" in this context primarily means that, when the drive is designed for greater maximum forces, strokes, and particularly holding forces (against a return spring, for example), the mass of the armature is greatly increased. The armature mass increases approximately as the square of the desired nominal holding force. This makes drives according to the embodiments illustrated in DE 10 2011 080 065 A1 less well suited as replacements for, by way of example, the conventional spring drive mechanisms in large high-voltage circuit breakers. In addition, the embodiments mentioned above also demonstrate high (maximum) transverse forces during operation, which are exerted on the armature as the result of unavoidable manufacturing inaccuracies, as well as (elastic) deformations, etc., thereby placing loads on the bearing of the armature.

The problem addressed by the present disclosure is therefore that of identifying an arrangement which is more scalable, and which has much lower transverse forces than the drives known from DE 10 2011 080 065 A1.

The problem named above is addressed by an electromagnetic linear drive according to the features and structures disclosed herein.

Accordingly, a scalable, highly dynamic electromagnetic linear actuator with limited stroke is described below. The linear actuator is characterized by low transverse forces. According to one embodiment, the linear actuator comprises the following:
- a stator which has two soft magnet arms;
- an at least partially flat armature made of soft magnet material, which is arranged in a manner allowing movement along an axis between the arms of the stator;
- at least two flat coils with a soft magnet core and high winding depth, which are attached to the stator (stator coils), wherein the coil cores are part of the soft magnet arms or are conductively connected to the same;
- at least one flat coil (armature coil) with a soft magnet core and high winding depth, which is attached to the armature, wherein the coil core can be part of the armature and/or formed from the same, or the armature coil is positioned, with its soft magnet core, lying in a recess of the flat armature;
- a well-defined stroke initiation position and stroke end position ("end positions");
- at least one switchable means which is designed to hold the armature in at least one end position against a return force—by way of example, a magnetic latching solenoid which is mechanically connected to the armature, or a mechanical latch;
- a switchable power supply consisting of an energy storage device, such as a capacitor bank, and at least one switch.

The armature and/or the stator arms can be made of laminated sheet packages or plastic-bonded soft magnet powders.

"At least partially flat armature" in this case means that at least the part of the armature which plunges into the stator—that is, between the arms thereof—is flat: The distance between the stator arms, and therefore the gap G in which the armature can move (with the least possible residual air gaps), is substantially smaller than the depth O (width) of the armature (and the arms, perpendicular to the gap and perpendicular to the direction of movement), and also smaller than the longitudinal extension of the armature along the movement direction. For example, the width O of the (rectangular) armature is at least three times as large as the gap G—that is, the normal distance between the stator arms. According to one embodiment, the width O is at least five times, in particular at least ten times, as large as the gap G.

The "flat coils" according to the present disclosure are flat to the extent that the length L of each (along the coil axis) is much smaller than the smallest outer diameter thereof. "High winding depth" in this context means that the height of the winding window H (along the direction of movement)

lies in both the order of magnitude of the (nominal) stroke S and in the order of magnitude of the longitudinal extension K of the soft magnet coil cores along the movement direction—by way of example $H=\frac{2}{3}*S$. A "winding window" is the region of the coil which is filled with copper during operation, through which current flows. Therefore, a coil with a symmetric construction has two equally long winding windows, with a spacing (normal to the coil axis) which corresponds to the width K of the coil core. The dimension of the winding window along the longitudinal axis (normal to the coil axis) of the linear actuator is termed the winding depth H.

As mentioned, a flat coil is generally a coil wherein the smallest external dimension (twice the winding depth plus the smallest outer dimension of the core) thereof is greater than the length thereof. According to one embodiment, the winding depth H is at least two times as large as the length L of the coil (along the coil axis). According to a further embodiment, the winding depth is at least three times as large—and by way of example at least five times as large—as the length L of the coil.

The drive is, with respect to the geometry of all parts experiencing electromagnetic force densities (the (soft) magnetic and electrical parts) which must be taken into account, characterized by having essentially two mutually perpendicular mirror planes (planes of symmetry) oriented parallel to the direction of movement, the line of intersection of which (which is also the longitudinal axis) is therefore an axis of rotation with two symmetry points, running parallel to the movement direction. (The armature is mounted on the stator arms in a manner allowing sliding; and the armature and stator therefore form a glide bearing or are equipped with such a bearing.)

The result of this symmetric configuration is that the stator coils are attached to the stator arms in pairs: for each first flat coil attached to a first arm, there is a second flat coil attached on the second arm paired with the same. These stator coils must—similarly to a Helmholtz coil—be able to be fed current in the same direction, wherein according to the present disclosure both coils are able to generate the most identical possible magnetic flux during operation (which can be easily achieved by using stator coils which are as identical as possible, connecting the same electrically in series). With current flowing through the stator coils in the same direction during a switching operation, magnetic flux (primary circuit) arises from the core of a first stator coil, passes through the flat armature lying in the gap, and optionally the armature coil(s) transversely, and enters the core of the second stator coil. (The same applies to the second stator coil; the division of the coils into the first and second stator coil is arbitrary due to the symmetric configuration.) The magnetic flux returns via the arms and armature. To drive the armature from the stroke initiation position into the stroke end position (ON switching operation), current is fed to the armature coil(s), which is/are between the stator coils, in the opposite direction as the stator coils, in such a manner that they generate a flow (in amplitude) which is as identical as possible with that of the associated stator coils together. According to the present disclosure, the current is supplied at such a level that during an ON-operation, soft magnet material situated between the armature and stator coils is magnetically saturated, and it is possible to achieve a flux density locally which exceeds the saturation polarization of the material.

The stator arms and the armature are designed in such a manner that the magnetic field generated by the stator coils and armature coil(s) does not flow through any appreciable air gap. However, a very small air gap could result from manufacturing inaccuracies.

In the stroke initiation position the armature coil(s) is/are not arranged coaxially to the corresponding stator coils, but rather pushed toward the stroke end position (for example, by a half-winding depth 0.5*H); according to the present disclosure, therefore, current can be fed to all coils such that the armature and stator coil(s) repulse each other along the axis of movement in the stroke initiation position, wherein the force acting on the armature coil(s) is transmitted by the same to the armature, driving the same towards the stroke end position. An (additional) attractive force can be generated for the return to the stroke initiation position by feeding current in the same direction to all armature and stator coils(s).

BRIEF DESCRIPTION OF DRAWINGS

The present disclosure is described in greater detail below with reference to the examples illustrated in the figures. The illustrations are not necessarily to scale, and the invention is not limited only to the aspects shown. Rather, importance is given to illustrating the principles underlying the present disclosure. In the figures.

In the figures, reference numbers which indicate the same or similar components with the same or corresponding meaning are the same.

DETAILED DESCRIPTION

Figure 1:
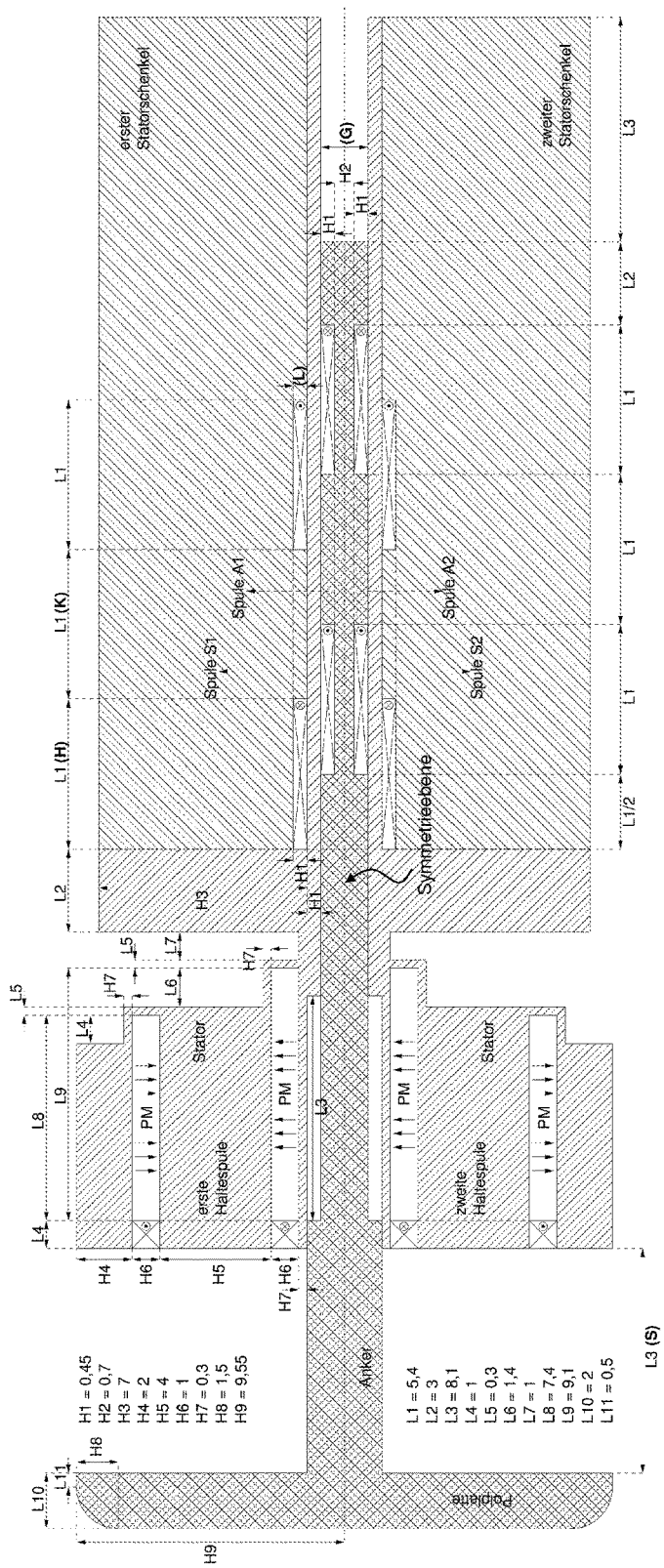
FIG. 1 shows a longitudinal cross-section of a linear actuator according to one example of the present disclosure.

The present disclosure is explained in more detail below with reference to an exemplary embodiment of a linear drive. FIG. 1 shows a longitudinal cross-section of an exemplary drive. In the illustrated embodiment, the drive is not rotationally symmetric. In the embodiment, it has a rectangular cross-section. The shaded areas indicate sheet metal sections; by packetizing such electric sheets, the magnetic circuit of the drive is formed. Grooves result from the design of the sheet sections, and the stator and armature coils can be placed and/or inserted into said grooves as very flat rectangular coils (with a rectangular "core"). The coils are at least encapsulated, and if necessary can be reinforced—by way of example using tensile strength fibers encapsulated with the coil which preferably have a higher tensile modulus than the electrical wire itself. Flat copper wire is suitable as the wire, and in any case a profile wire is preferred which allows the greatest possible (copper) filling degree. "PM" indicates permanent magnets; the arrows pointing into the associated components symbolize their polarization direction. The permanent magnets (preferably neodymium iron boron, NdFeB) therefore lie in recesses which are formed by molding the stator sheet. Two additional (rectangular) coils ("holding coils") are positioned in the same recesses, and serve as the switchable means according to the present disclosure, together with the PMs and the rear portion of the armature which is designed as the pole plate, for the purpose of holding the drive in the stroke end position (against a return force) (in the stroke end position, the distance S =0). The multiple pole pitch of this holding apparatus enables a substantial reduction in the mass of the armature, and therefore enhances the dynamics of the drive. The feed of current to the holding coils (excitation), during the ON switching process as well—that is, when the drive starts up (i.e., the space L3 becomes smaller)—is able to not only increase the force of the drive near the stroke end position, but can also magnetize the PM and extend the service life thereof. The reference numbers in brackets—e.g. the reference L3 (S) for the stroke—indicate the respective value (e.g. the stroke S) in general. The reference given before the brackets denotes a specific parameter (for example, in the initial position of the stroke, S is equal to the length L3).

To switch off the holding force (OFF operation), current is fed to the holding coils in opposite directions, (counter excitation) from the ON switch operation, wherein a lower current is advantageously used for an OFF operation than for the ON operation. This increases the service life of the permanent magnets. For the purpose of mechanical stabilization of the stator (that is, avoiding large bending moments), individual sheets of the stator lamination stack can be cut out with less depth than the remaining material, such that, while there is enough space remaining to accommodate the coil, the otherwise continuous sheets form chambers or honeycombs with the others into which the PM can be set. The design must take into account that these continuous stator sheets form magnetic short circuits. (The sheets with a divergent shape, which serve to form the chambers which receive the PM, need not consist—either partially or entirely—of soft magnet material; however, they can be made of the same soft magnet material as the other stator sheets.) The mounting of the stator, bearing of the armature, and power transmission to the application are routine mechanical engineering tasks. The bearing in this case is particularly simple to implement to the extent that the armature is only subjected to very small transverse forces during operation. The ensemble of stator and armature coils (S1, S2, A1, A2) can, together with the magnetic circuit, be regarded as an extreme version of a transverse flux motor with a linear structure (which can operate in deeper local saturation). For the embodiment of the present disclosure, certain geometric conditions and an appropriate design of the power supply can be advantageous. In addition to the geometrical proportions described herein, the following also applies for the embodiment: L<<K (due to the "soft magnet" bridge; see DE 10 2011 080 065 A1); 2×L≤G is also advantageous.

Figure 2:
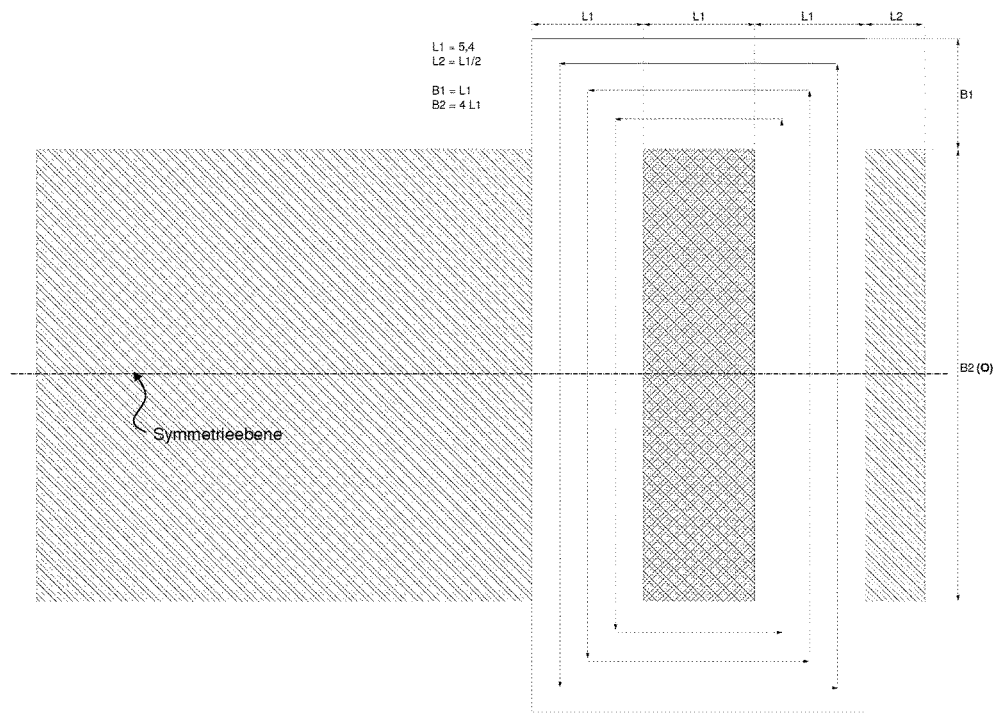
FIG. 2 shows a top view of the armature of the actuator in FIG. 1.

FIG. 2 shows a top view of the armature wherein the dimension B2 corresponds to the structural depth of the actual magnetic circuit. In the present example, 100 electrical sheets with an effective thickness of 1 mm are packaged to a B2=100 mm-deep sheet laminate, by way of example; the stator has the same depth, for example. This scalability of the drive is shown here: the achievable holding force, as well as the maximum force of the drive which can be achieved, increase almost linearly with B2—and therefore nearly proportional to the mass moved by the drive. (As an explanation of the features and structures disclosed herein: the "flat armature" is realized in the embodiment by O being >>G. By way of example, O>3·G, e.g. O>5·G or O>10·G.)

The rotary arrow symbolizes a possible winding direction of a (flat) armature coil (see coil A1 in FIG. 1). As a further guide for the configuration: 2×H+K<O. The flat coils are spaced laterally from the actuator by a length B1. In practice, the length B1 corresponds to the winding depth H.

The operation of the drive is easily understood using the given 2D simulations (FIG. 3a, 3b, 3c, 3d, 3e). The B field is shown in a static simulation. However, with sufficiently fine sheet lamination for suppression of eddy currents, the static B field is very similar to that in the transient case. The length of the arrows has been adjusted logarithmically for clarity.

The simulations only show the section of the drive which contains the ensemble of the flat armature and stator coils according to the present disclosure (A1, A2 and/or S1, S2 in FIG. 1), as well as the associated magnetic circuit. As concerns current flow, the coils can be connected in series in such a manner that, during an ON switching operation (the energizing of the armature), current is fed to the stator and armature coils in opposite directions—wherein, by way of example, all coils are identical in structure and particularly have the same wire cross-sections and number of windings. Current is fed to the stator coils (S1, S2 in FIG. 1) in the same direction, as is the current to the armature coils (A1, A2 in FIG. 1); however, the current directions in the stator and armature coils are opposite. In the simplest case, a capacitor is discharged by means of a switch, for example a semiconductor switch, via the series circuit above.

Figure 3A:
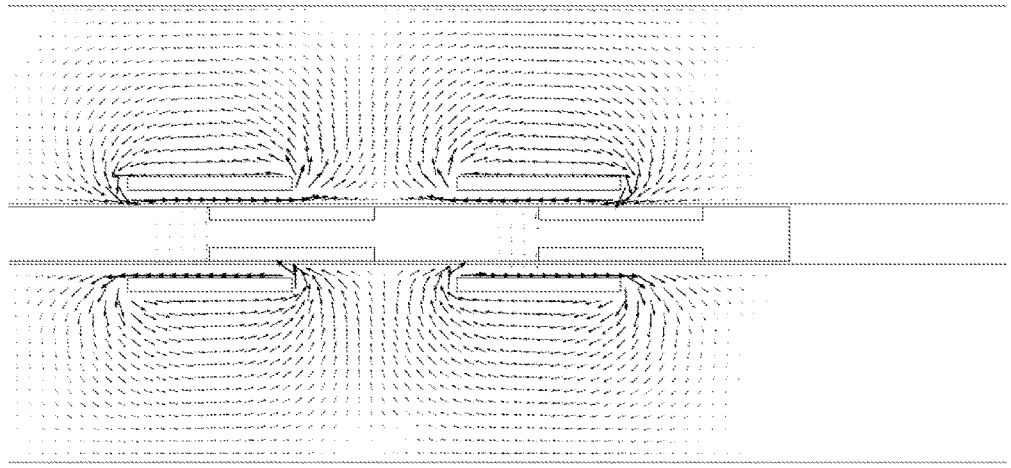
FIG. 3 shows the simulated B-field of the actuator in FIG. 1 in different states (diagrams 3*a* to 3*e*)

FIG. 3a): On startup, the drive initially has high inductance and the current increase rate is low, which protects the switch. At this stage, only a small transverse flux occurs (that is, a flux passing through the armature through the horizontal plane of symmetry.

Figure 3B:
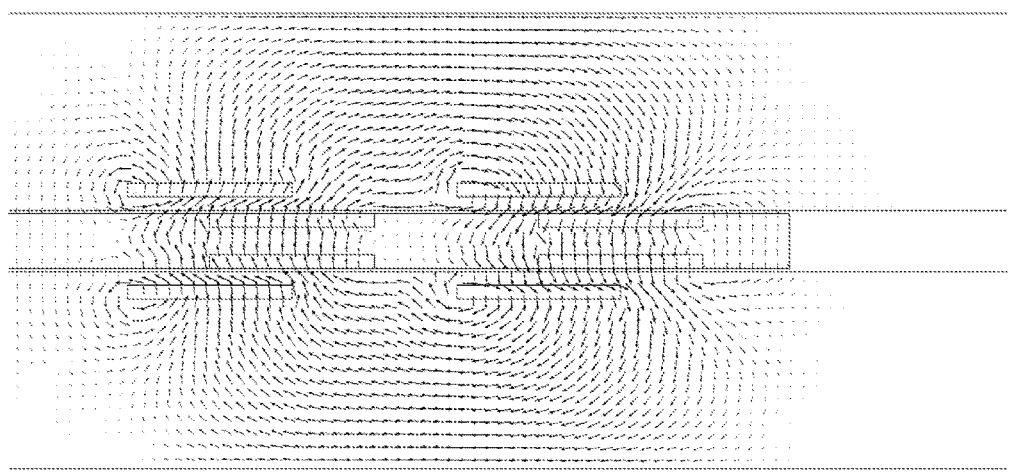

FIG. 3b): However, soon the magnetic circuit becomes locally saturated. At this point, the device functions (magnetically) like a differential transformer; the inductances of the armature coils and stator coils partially drop off, and the self-inductance of the series circuit collapses. This causes a rapid and large increase in the rate of current rise by, for example, an order of magnitude (factor of 10)—accompanied by a very high rate of force increase which is (mainly) limited by the time constants of the eddy currents in the "iron", even appreciably from the skin effect in the "copper". This must be taken into account in the selection of the soft magnet material, and optionally also the lamination thereof, and the choice of copper wire (and the profile thereof).

Figure 3C:
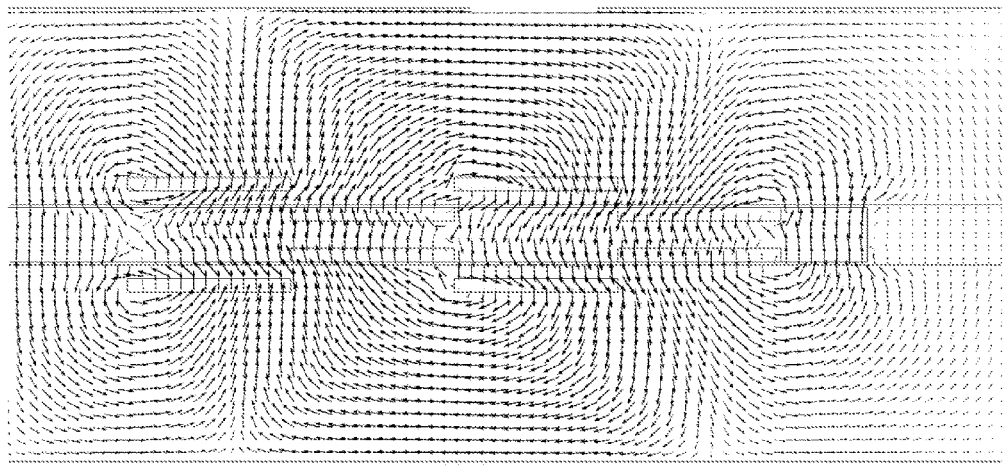

FIG. 3c): FIG. 3c shows the drive at ⅓ of the stroke. Near this point, the ensemble (S1, S2, A1, A2) demonstrates the highest force at a constant current. The reluctance exerted on the part of the armature illustrated also contributes to the energizing.

Figure 3D:
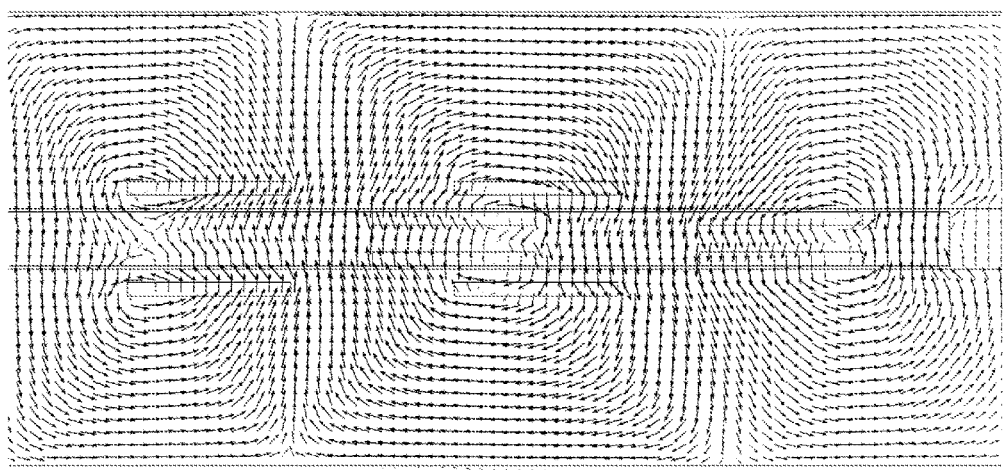

FIG. 3d): FIG. 3d shows the drive when the armature has already covered ⅔ of the stroke.

Figure 3E:
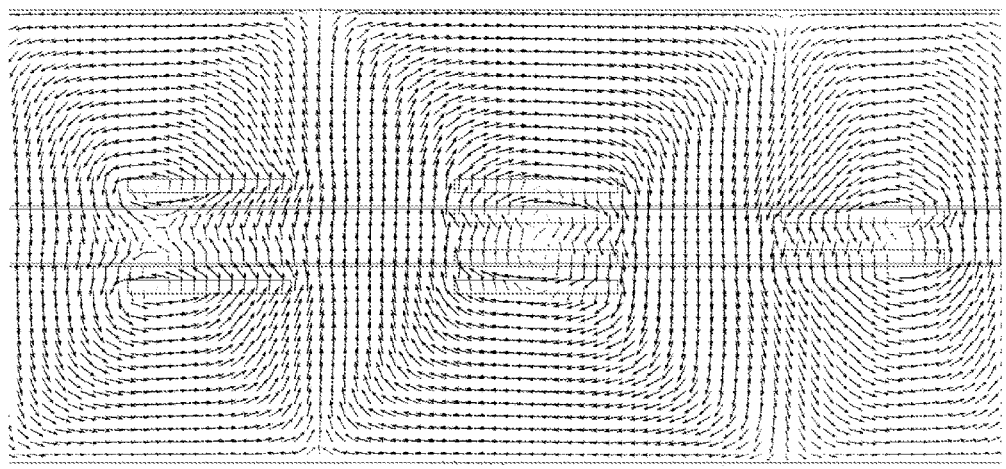

FIG. 3e): FIG. 3e shows the drive in the stroke end position. Even here, the force between the coils does not disappear. When the drive actuation is complete (FIG. 3 only shows the right-most portion of the actuator in FIG. 1—without the self-locking magnets on the left side), of course the reluctance exerted on the pole plate, and/or the components thereof in the direction of movement, are added to this force.

The situation illustrated in FIG. 3a was calculated at 20 ampere turns—and in the situations shown in FIGS. 3b to 3e at 20,000 ampere turns, which can easily be achieved by means of a capacitor discharge.

For all armature and stator coils A1, A2, S1, S2 of the drive according to FIG. 1, 20 turns of flat copper overcoat wire can be used if the indicated ratio is interpreted in mm. The holding coils can have a greater number of turns.

Power Supply: A capacitor can be contemplated, in the simplest case, as the power supply for drives according to the present disclosure, the same being charged and discharged by means of a switch, for example a thyristor, via a series circuit of the armature and stator coils which are functionally assigned to each other. In the present example in FIG. 1, this would be S1, S2, A1, A2. If the armature and stator coils are energized in opposite directions, the armature is driven towards its stroke end position. The return of the armature into the stroke initiation position can occur by means of springs, by feeding current to the armature and stator coils in the same direction, or both. For the purpose of increasing the electrical efficiency or influencing the force-displacement or force-time curve, the maximum current in the system can be delayed—by way of example by using an inductor (saturating or linear) to delay the capacitor discharge. In addition, multiple capacitors and inductors can be connected in a configuration of delay lines, or according to the principle of magnetic pulse compression.

Figure 4:
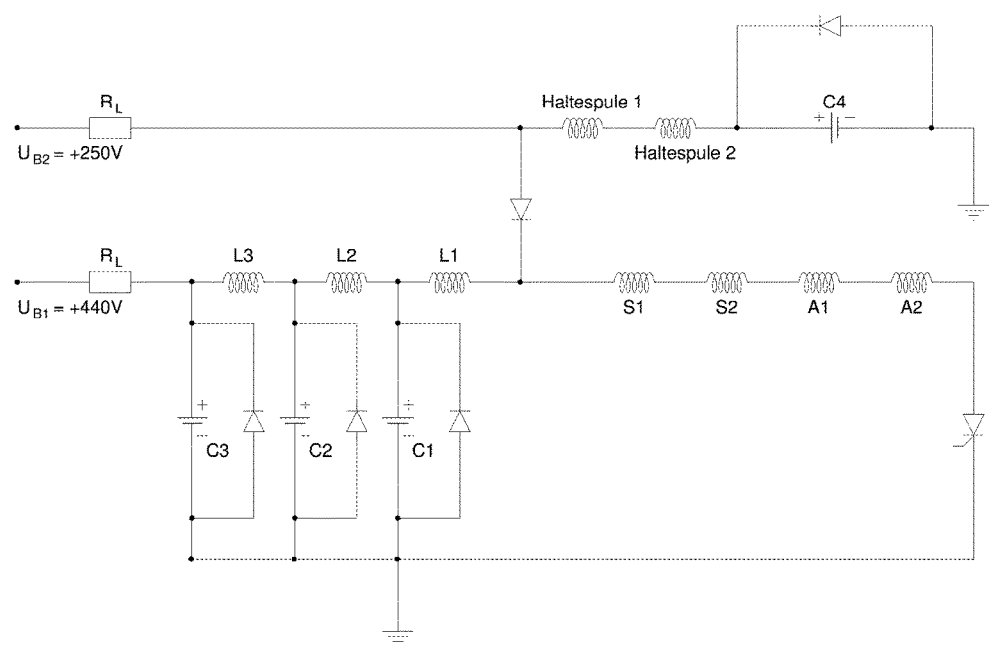
FIG. 4 shows a first example of a driver circuit with two different charging voltages.

FIG. 4 shows a simple circuit with two different charging voltages, which can not only result in an improved overall efficiency compared to a simple capacitor discharge circuit, but also in a more uniform force-displacement curve which can be (passively) adapted to the application. This adaptation can be achieved by the appropriate choice of the component parameters—in particular the capacitor capacities and the number of turns of the coils. Furthermore, with a suitable design, current is only fed to the holding coils when the armature is near the stroke end position and the distance between the pole plate and the pole shoes is already so small that the current fed to the holding coils can effectively contribute to the reluctance (in the direction of movement) experienced by the pole plate. FIG. 4 shows a wiring for STARTING the armature. For the return movement, as mentioned, a current must be fed in the opposite direction by a further circuit in order to reduce the holding force of the permanent magnets. Then, either a spring and/or a spring system which is connected to the armature can drive the same back, and/or the armature and stator coils are fed current in the same direction.

Figure 5:
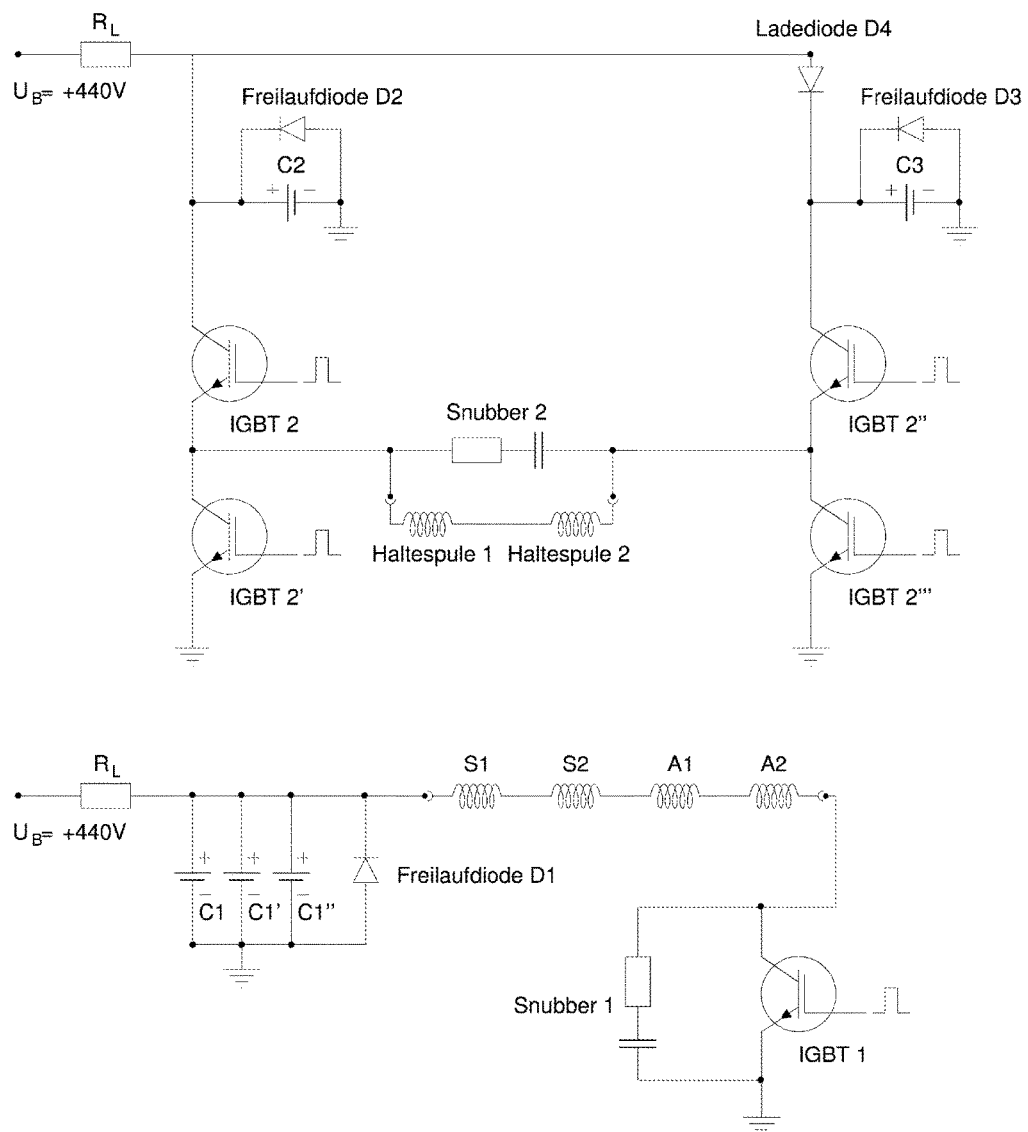
FIG. 5 shows a second example of a driver circuit with two different charging voltages.

FIG. 5 shows, as an alternative, an active circuit which uses a plurality of semiconductor switches which can be turned off (IGBTs in the example). In this case, the IGBTs 2-2' are designed as full bridges. With appropriate signaling (control), the circuit can be used to charge the capacitors C1-C3 and to discharge the same for both ON switching operations and OFF switching operations. Using RC suppression components (snubber 1 and 2 in the example), the voltage peaks can be attenuated during switching of the inductive loads to protect the IGBTs. The capacitors C1-C3 are each protected by one flyback diode against polarity reversal. As long as IGBT 1 and (at least) IGBT 2 and 2" are connected without conductance, the capacitors can be charged. If the drive is initially in the ON position (closed working air gap), the conducting circuit from IGBT 2' to 2" leads to a current feed by the capacitor C3 to the holding coils which compensates the holding force of the permanent magnets. At this point, a restoring spring force can bring the actuator into the OFF position (fully open working air gap). After an arbitrary time window, the reverse process—the energizing of the armature—is possible, by the capacitor bank C1-C1" being discharged via the series circuit A1, A2, S1, S2, after IGBT 1 has been connected and is conducting. Advantageously, the current is only fed to the holding coils from the capacitor C2 after a certain time delay, by switching the IGBTs 2' and 2" to a non-conducting path when the IGBTs 2 and 2' are conducting, once the pole plate has entered the area of influence of the permanent magnets (and/or the pole shoes thereof). This process of opening/closing IGBTs can also of course be performed with position control and/or velocity control, provided that the position of the armature (optionally time-dependent) is measured. A great number of methods is known for this purpose.

Options for increasing efficiency and shortening actuating time: The drive described can not only actuate against a spring, but can also have an additional spring system which drives the armature from the open position (stroke initiation position) toward the closed position (stroke end position). To this end, a second constructive means should hold the armature in the stroke initiation position against this additional spring force—by way of example a construction which is similar to the holding system already described in the stroke end position (holding coils and potentially permanent magnets ("magnetic latching solenoid")). The second, complementary spring system must be designed in such a manner that the armature is subjected to a force which accelerates the same from both end positions (stroke initiation and stroke end) in the direction of the center of the stroke. It is an advantage but not essential for the additional spring system to initially accelerate the armature toward the stroke end position before braking the same starting from a certain point in the stroke, such that the integral of the spring force is zero over the stroke. Ultimately, the armature velocity increases over the entire stroke, which is known to increase the efficiency of the machine: the electrical energy fed to the drive is converted into heat loss and useful work. The ratio of useful work to supplied energy is the degree of efficiency. The useful work is a function of the travel, which is finite. However, the heat loss—primarily Ohmic heat—is a function of time and increases continuously monotonously. The faster a given actuating path is traveled, the lower the resistive component and the higher the efficiency.

According to this method, an actuation proceeds as follows, by way of example: the means which holds the armature in its stroke initiation position, against the spring force, is released (by way of example, by reversing the current to the "holding coils", i.e. the magnetic latching solenoid). Next, the spring system initially accelerates the armature in the direction of the stroke center. At the same time, or with a certain delay, current is connected to the armature and stator coils. These then additionally accelerate the armature, particularly with significantly higher efficiency than if they would accelerate it from a position of rest. The kinetic energy which is relayed to the armature in this process is partially restored to the spring system upon the approach to its stroke end position.

The invention claimed is:

1. A scalable, highly dynamic electromagnetic linear drive having limited stroke, comprising:
   a stator which has two soft magnet arms;
   an at least partially flat armature made of soft magnet material, which is arranged in a manner allowing movement along a longitudinal axis between the arms of the stator;
   at least two flat stator coils, each with a soft magnet stator coil core and high winding depth, which are attached to the stator, wherein the stator coil cores are part of the soft magnet arms or are connected to the soft magnet arms in a manner allowing magnetic conductance;
   at least one flat armature coil with a soft magnet flat coil core and high winding depth, which is attached to the partially flat armature, wherein the soft magnet flat coil core is part of the partially flat armature and/or formed from the partially flat armature, or the flat armature coil is positioned, with its soft magnet flat coil core, lying in a recess of the partially flat armature;
a well-defined stroke initiation position and stroke end position;
at least one switchable means which is designed to hold the armature in at least one end position against a return force;
a switchable power supply comprising an energy storage device and at least one switch; and
wherein the two stator coils are arranged on two sides of the stator arms which lie opposite each other, and are arranged coaxially, such that the stator coils share a common coil axis which is oriented normal to the longitudinal axis.

2. The linear drive according to claim 1, wherein the switchable means is a self-locking magnet which is mechanically connected to the armature.

3. The linear drive according to claim 1, wherein the switchable means is a mechanical latch.

4. The linear drive according to claim 1, wherein the energy storage device is a capacitor bank.

5. The linear drive according to claim 1, wherein the armature and/or the stator arms consist of laminated sheet packages or plastic-bonded soft magnet powders.

6. The linear drive according to claim 1, wherein the armature has a rectangular cross-section, normal to the longitudinal axis, the height of which is substantially less than the width thereof.

7. The linear drive according to claim 1, wherein the stator coils have a length, normal to the longitudinal axis, as well as a winding height along the longitudinal axis which is substantially greater than the length.

8. The linear drive according to claim 7, wherein the stator coils have a core which has a width along the longitudinal axis, wherein the winding height of the stator coils is approximately the same measure as the width of the stator coil core, and is a maximum stroke of the linear drive.

9. The linear drive according to claim 8, wherein the winding height of the stator coils is around two-thirds of the maximum stroke of the linear drive.

10. The linear drive according to claim 1, wherein current is fed to the stator coils in the same direction.

11. The linear drive according claim 1, wherein the at least one flat armature coil and the stator coils are designed in such a manner that, and current is fed to the same in such a manner that, the at least one flat armature coil generates approximately the same magnetomotive force as the two stator coils.

12. The linear drive according to claim 1, wherein the level of flow of current is chosen such that, and the material of the armature and/or of the stator in the region between the at least one flat armature coil and the stator coils is chosen such that, the same is magnetically saturated, and is able to achieve a local magnetic flux density which exceeds the saturation polarization of the material.

13. The linear drive according to claim 1, wherein the stator arms and armature are designed in such a manner that the magnetic field generated by the stator coils and the at least one flat armature coil does not flow through any appreciable air gap.

14. The linear drive according to claim 1, wherein the linear drive has a symmetric, but not rotationally symmetric, construction, such that it has two planes of symmetry which intersect at the longitudinal axis.

15. The linear drive according to claim 1, wherein the linear drive has a symmetric construction such that it has two planes of symmetry, wherein the line of intersection thereof is an axis of rotation with two points of symmetry, and corresponds to the longitudinal axis.

16. A scalable, highly dynamic electromagnetic linear drive having a limited stroke, comprising:
a stator which has two soft magnet arms;
an at least partially flat armature made of soft magnet material, which is arranged in a manner allowing movement along a longitudinal axis of movement between the arms of the stator;
at least two flat stator coils, each with a soft magnet stator coil core and high winding depth, which are attached to the stator, wherein the stator coil cores are part of the soft magnet arms or are connected to the soft magnet arms in a manner allowing magnetic conductance;
at least one flat armature coil with a soft magnet flat coil core and high winding depth, which is attached to the partially flat armature, wherein the soft magnet flat coil core is part of the partially flat armature and/or formed from the partially flat armature, or the flat armature coil is positioned, with its soft magnet flat coil core, lying in a recess of the partially flat armature;
a well-defined stroke initiation position and stroke end position;
at least one switchable means which is designed to hold the armature in at least one end position against a return force;
a switchable power supply comprising an energy storage device and at least one switch; and
wherein the at least one flat armature coil has a coil axis which is oriented normal to the longitudinal axis and parallel to the coil axis of the stator coils, and wherein it is possible to feed current to the at least one flat armature coil in the opposite direction as the stator coils in order to move the armature from the stroke initiation position into the stroke end position.

17. The linear drive according to claim 16, wherein, in the stroke initiation position, the coil axis of the at least one flat armature coil is arranged with an offset relative to the coil axis of the stator coils along the longitudinal axis, such that a normal space between the coil axes becomes greater when the armature is moved out of the stroke initiation position and toward the stroke end position.

18. The linear drive according to claim 17, wherein the offset between the coil axes of the at least one flat armature coil and the stator coils is around half of the winding height of a stator coil.

19. The linear drive according to claim 17, wherein the offset between the coil axes of the at least one flat armature coil and the stator coils is in a range between 0.5 and 1 times the winding height of a stator coil.

20. A scalable, highly dynamic electromagnetic linear drive having limited stroke, comprising:
a stator which has two soft magnet arms;
an at least partially flat armature made of soft magnet material, which is arranged in a manner allowing movement along a longitudinal axis of movement between the arms of the stator;
at least two flat stator coils, each with a soft magnet stator coil core and high winding depth, which are attached to the stator, wherein the stator coil cores are part of the soft magnet arms or are connected to the soft magnet arms in a manner allowing magnetic conductance;
at least one flat armature coil with a soft magnet flat coil core and high winding depth, which is attached to the partially flat armature, wherein the soft magnet flat coil core is part of the partially flat armature and/or formed from the partially flat armature, or the flat armature coil is positioned, with its soft magnet flat coil core, lying in a recess of the partially flat armature;
a well-defined stroke initiation position and stroke end position; and
wherein the at least one flat armature coil has a coil axis which is oriented normal to the longitudinal axis and parallel to the coil axis of the stator coils, and wherein it is possible to feed current to the at least one flat armature coil in the opposite direction as the stator coils in order to move the armature from the stroke initiation position into the stroke end position.

* * * * *